(12) United States Patent
Cheng

(10) Patent No.: US 10,412,205 B2
(45) Date of Patent: Sep. 10, 2019

(54) CAMERA ASSEMBLY AND MOBILE ELECTRONIC DEVICE

(71) Applicant: GUANGDONG OPPO MOBILE TELECOMMUNICATIONS CORP., LTD., Dongguan, Guangdong (CN)

(72) Inventor: Jiao Cheng, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 15/968,118

(22) Filed: May 1, 2018

(65) Prior Publication Data

US 2018/0324286 A1 Nov. 8, 2018

(30) Foreign Application Priority Data

May 3, 2017 (CX) .......................... 2017 1 0305891

(51) Int. Cl.

| H04M 1/00 | (2006.01) |
|---|---|
| H04M 1/02 | (2006.01) |
| G01J 1/42 | (2006.01) |
| H04N 5/225 | (2006.01) |
| H04N 5/235 | (2006.01) |
| H04N 5/369 | (2011.01) |

(52) U.S. Cl.
CPC ......... *H04M 1/0264* (2013.01); *G01J 1/4204* (2013.01); *H04N 5/2253* (2013.01); *H04N 5/2257* (2013.01); *H04N 5/2258* (2013.01); *H04N 5/2351* (2013.01); *H04N 5/3696* (2013.01)

(58) Field of Classification Search
CPC .... H04N 5/247; H04N 5/3696; H04M 1/0264

USPC ....................................................... 455/556.1
See application file for complete search history.

(56) References Cited

U.S. PATENT DOCUMENTS

| 9,497,367 B1 | 11/2016 | Kozko et al. |
| 2008/0151194 A1* | 6/2008 | Segev .................. G03B 21/26 353/28 |

(Continued)

FOREIGN PATENT DOCUMENTS

| CN | 101771816 A | 7/2010 |
| CN | 102595030 A | 7/2012 |

(Continued)

OTHER PUBLICATIONS

European Patent Application No. 18170252.3 extended Search and Opinion dated Jul. 19, 2018, 11 pages.

(Continued)

*Primary Examiner* — William D Cumming
(74) *Attorney, Agent, or Firm* — Lathrop Gage LLP

(57) ABSTRACT

A camera assembly and a mobile electronic device are provided. The camera assembly includes at least two image sensors. Each image sensor includes a pixel array and a control circuit. The pixel array includes a light sensing region and an imaging region. The control circuit is configured to control the light sensing region to detect an illumination intensity when receiving a light sensing instruction and to control the imaging region to obtain an image when receiving an imaging instruction. The mobile electronic device includes a camera assembly and a processor. The processor is configured to generate the light sensing instruction and the imaging instruction.

19 Claims, 9 Drawing Sheets

(56) References Cited

U.S. PATENT DOCUMENTS

| | | | |
|---|---|---|---|
| 2012/0092541 A1 | 4/2012 | Tuulos et al. | |
| 2012/0176533 A1 | 7/2012 | Cellier et al. | |
| 2013/0076712 A1 | 3/2013 | Zheng et al. | |
| 2014/0211054 A1 | 7/2014 | Kim | |
| 2015/0046505 A1 | 2/2015 | Sun et al. | |
| 2016/0037070 A1* | 2/2016 | Mandelli | H04N 5/3696 348/322 |
| 2017/0134623 A1* | 5/2017 | Lee | H04N 5/247 |
| 2018/0324287 A1* | 11/2018 | Zhou | H04M 1/0264 |
| 2018/0324342 A1* | 11/2018 | Zhou | H04M 1/0264 |

FOREIGN PATENT DOCUMENTS

| | | | |
|---|---|---|---|
| CN | 103118231 A | 5/2013 | |
| CN | 105472209 A | 4/2016 | |
| CN | 107222591 A | 9/2017 | |
| CN | 107249109 A | 10/2017 | |
| CN | 107426470 A | 12/2017 | |
| CN | 107426471 A | 12/2017 | |
| WO | WO 2004008755 A1 | 1/2004 | |
| WO | WO 2008140896 A1 | 11/2008 | |

OTHER PUBLICATIONS

PCT/CN2018/085360 English translation of International Search Report and Written Opinion dated Aug. 19, 2018, 10 pages.
Chinese Patent Application No. 201710305891.5 English translation of Office Action dated Apr. 3, 2019, 6 pages.
Chinese Patent Application No. 201710305891.5 Office Action dated Apr. 3, 2019, 6 pages.

\* cited by examiner

CAMERA ASSEMBLY AND MOBILE ELECTRONIC DEVICE

CROSS-REFERENCE TO RELATED APPLICATIONS

This application is based on and claims priority of Chinese Patent Application No. 201710305891.5, filed on May 3, 2017, the entire contents of which are incorporated herein by reference.

FIELD

The present disclosure relates to electronic devices, and more particularly to a camera assembly, and a mobile electronic device.

BACKGROUND

Typically, a front camera can be set on a phone to capture a selfie, while a light sensor can be set to adjust display brightness of a screen of the phone according to ambient brightness. However, when both the front camera and the light sensor are set on the phone, a large space would be occupied by them, such that the space for locating the display screen in the phone decreases, thus leading to a low screen-to-body ratio.

DISCLOSURE

Embodiments of the present disclosure provide a camera assembly and a mobile electronic device.

The camera assembly according to embodiments of the present disclosure includes at least two image sensors. Each image sensor includes a pixel array and a control circuit. The pixel array includes a light sensing region and an imaging region. The control circuit is configured to control the light sensing region to detect an illumination intensity when a light sensing instruction is received; and to control the imaging region to obtain an image when an imaging instruction is received.

The mobile electronic device according to embodiments of the present disclosure includes the camera assembly described above. The mobile electronic device further includes a processor. The processor is configured to generate the light sensing instruction and the imaging instruction.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings.

EMBODIMENTS OF THE PRESENT DISCLOSURE

Reference will now be made in detail to exemplary embodiments, examples of which are illustrated in the accompanying drawings, in which the same or similar reference numbers throughout the drawings represent the same or similar elements or elements having same or similar functions. Embodiments described below with reference to drawings are merely exemplary and used for explaining the present disclosure, and should not be understood as limitation to the present disclosure.

In the present disclosure, unless specified or limited otherwise, a structure in which a first feature is "on" a second feature may include an embodiment in which the first feature directly contacts the second feature, and may also include an embodiment in which the first feature indirectly contacts the second feature via an intermediate medium. Moreover, a structure in which a first feature is "on", "over" or "above" a second feature may indicate that the first feature is right above the second feature or obliquely above the second feature, or just indicate that a horizontal level of the first feature is higher than the second feature. A structure in which a first feature is "below", or "under" a second feature may indicate that the first feature is right under the second feature or obliquely under the second feature, or just indicate that a horizontal level of the first feature is lower than the second feature.

Figure 1:
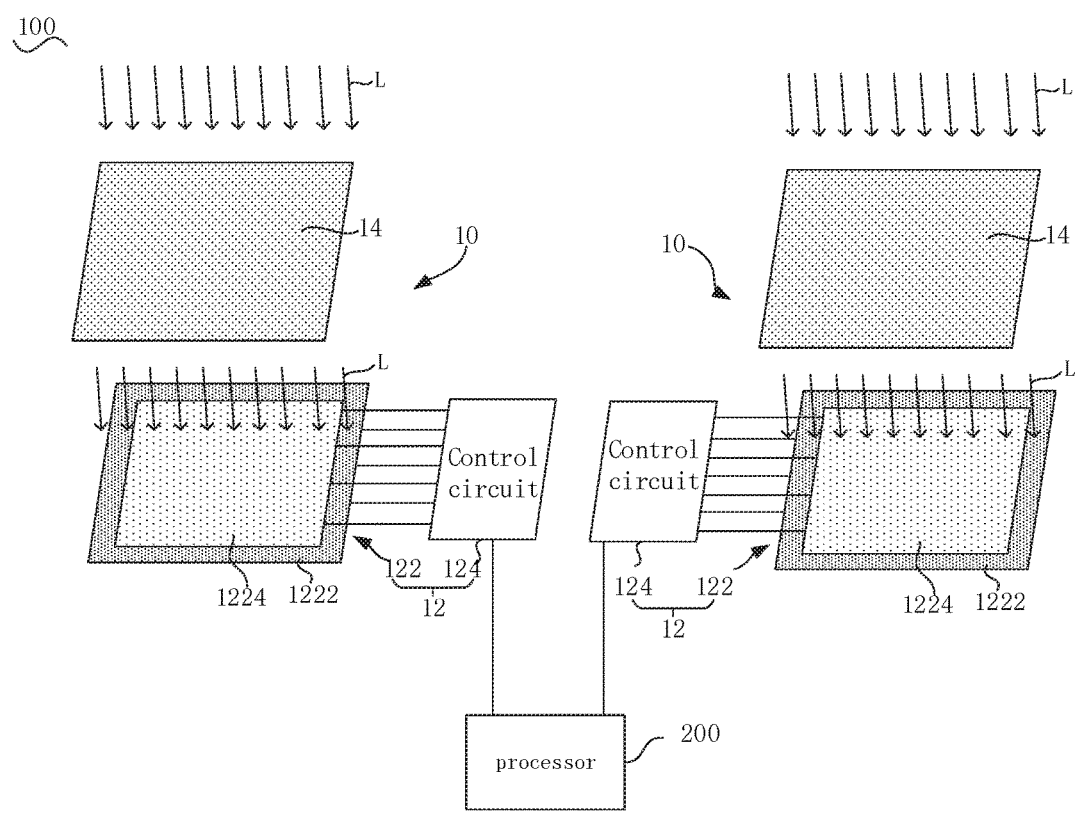
FIG. 1 is a schematic diagram of a camera assembly according to an embodiment of the present disclosure.
Figure 2:
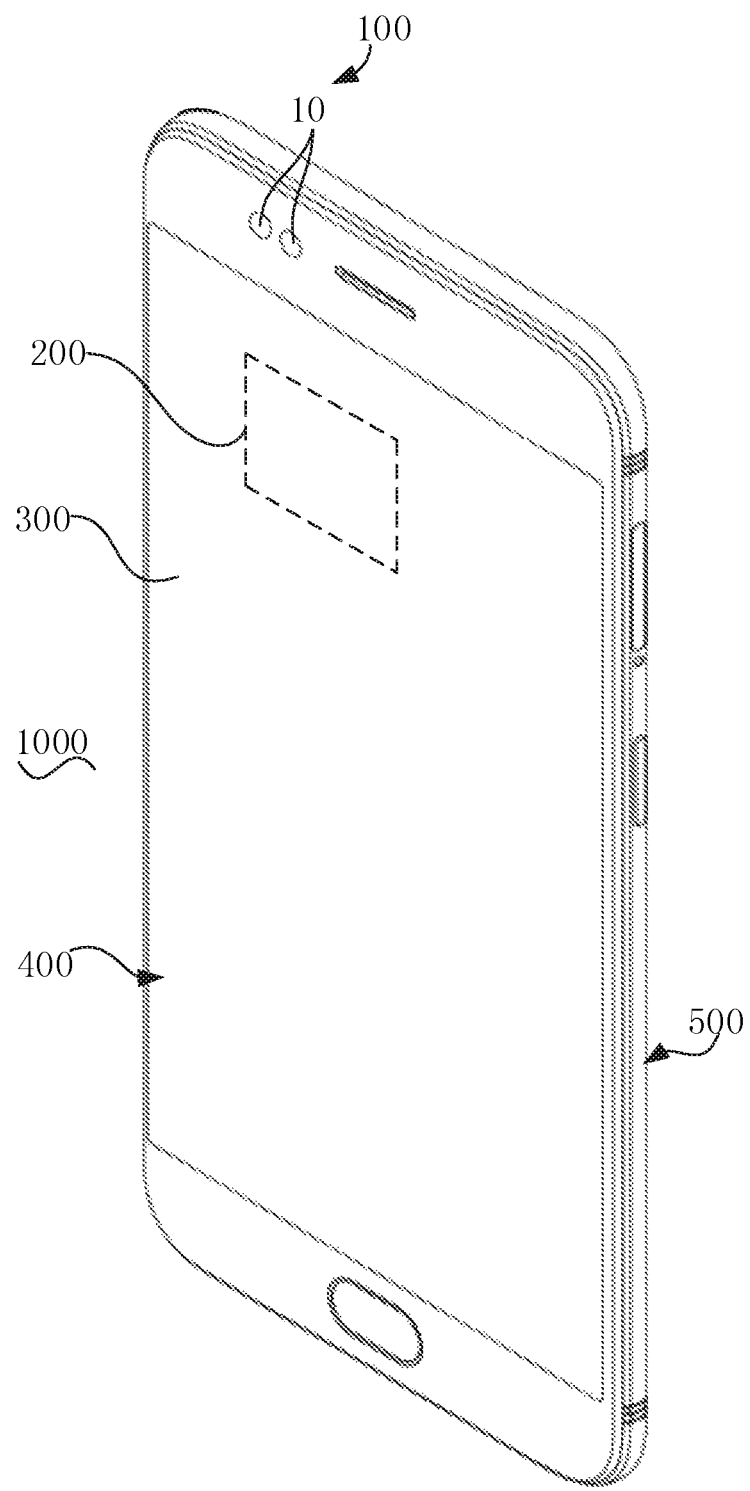
FIG. 2 is a schematic stereogram of an electronic device according to an embodiment of the present disclosure.

Referring to FIG. 1 and FIG. 2, the camera assembly 100 according to embodiments of the present disclosure includes two lens assemblies 10. Each lens assembly 10 includes an image sensor 12. Each image sensor 12 includes a pixel array 122 and a control circuit 124.

The pixel array 122 includes a light sensing region 1222 and an imaging region 1224. The control circuit 124 is configured to control the light sensing region 1222 to detect an illumination intensity when a light sensing instruction is received. The control circuit 124 is further configured to control the imaging region 1224 to obtain an image when an imaging instruction is received.

In some embodiments, the lens assembly 10 further includes a filter 14. The filter 14 and the imaging region 1224 are arranged correspondingly. Light would reach the imaging region 1224 after passing through the filter 14. The filter 14 may be an RGB filter 14. The RGB filter 14 can be arranged in Bayer array to allow light L to pass through the filter 14 and pass through the imaging region 1224, so as to obtain a color image. Further, in some embodiments, the lens assembly 10 may further include a visible filter. The visible filter and the light sensing region 1222 are arranged correspondingly to allow light L to pass through the visible filter and to reach the light sensing region 1222. In this way, after the light L passes through the visible filter, visible light of the light L can reach the light sensing region 1222, such that the light sensing region 1222 can detect the illumination intensity of the visible light, thus avoiding interference of invisible light such as infrared light, ultraviolet light or the like in the light L.

The camera assembly 100 according to embodiments of the present disclosure can be applied in an electronic device 1000 according to embodiments of the present disclosure. The electronic device 1000 further includes a processor 200. The processor 200 is configured to generate the light sensing instruction and the imaging instruction. In some embodiments, the electronic device 1000 further includes a display screen 300. The display screen 300 is configured to display data information such as video, image, text, icon and the like.

In the camera assembly 100 and the electronic device 1000 mentioned above, the control circuit 124 can realize both detection of the illumination intensity and acquisition of the image by controlling the pixel array 122. In this way, it is unnecessary to set both a camera component and a light sensor component, such that the number of components is reduced, a ratio of space for locating the display screen 300 can be increased, thus increasing the screen-to-body ratio of the electronic device 1000.

In some embodiments, two lens assemblies 10 include a main lens assembly and a secondary lens assembly. An area of the imaging region of the main lens assembly is larger than an area of the imaging region of the secondary lens assembly, such that the main lens assembly can realize a better imaging quality. Further, an area of the pixel array 122 of the main lens assembly can be the same as or be different from an area of the pixel array 122 of secondary lens assembly.

The electronic device 1000 may be a cell phone, a tablet computer, a smart watch or the like. The electronic device 1000 according to embodiments of the present will be explained by taking a cell phone as an example. The illumination intensity detected by the camera assembly 100 can be considered as the basis for adjusting display brightness of the display screen 300 of the electronic device 1000. For example, when the illumination intensity is high, the display brightness of the display screen 300 can be increased. When the illumination intensity is changed from a high value to a value less than a certain threshold, it can be determined that a user is answering the phone, such that the display screen 300 can be turned off. The image obtained by the camera assembly 10 can be displayed on the display screen 300, or stored in storage medium of the electronic device 1000 for reading or transmitting.

The camera assembly 100 together with the display screen 300 can be set on a front face 400 of the electronic device 1000. The camera assembly 100 can also be disposed on a back face 500 or side face of the electronic device 1000. The two lens assemblies 10 of the camera assembly 100 can be arranged laterally or longitudinally.

The processor 200 is configured to generate the light sensing instruction and the imaging instruction. Further, the processor 200 is configured to transmit the light sensing instruction and the imaging instruction to the control circuit 124. In some embodiments, the processor 200 can separately generate and transmit the light sensing instruction, or separately generate and transmit the imaging instruction, or simultaneously generate and transmit the light sensing instruction and the imaging instruction. The light sensing instruction and the imaging instruction can be generated by the processor 200 when receiving an input operation. The input operation can be an operation inputted by the user or by an application environment. For example, in the cell phone according to embodiments of the present disclosure, the light sensing instruction and the imaging instruction can be generated by the processor 200 after receiving an operation of touching the cell phone or pressing a certain function key (including a physical key, a virtual key) from the user. In some embodiments, the light sensing instruction and the imaging instruction can be generated by the processor 200 when the system time of the cell phone reaches a predetermined time point.

A single control circuit 124 can receive the light sensing instruction and the imaging instruction simultaneously. In other words, the control circuit 124 can simultaneously control the light sensing region 1222 to detect the illumination intensity and control the imaging region 1224 to acquire the image. Certainly, the control circuit 124 can also be configured to separately receive the light sensing instruction to control the light sensing region 1222 to detect the illumination intensity, or separately receive the imaging instruction to control the imaging region 1224 to acquire the image. When the control circuit 124 does not receive the light sensing instruction and the imaging instruction, the light sensing region 1222 and the imaging region 1224 may be in the non-operating state.

The two control circuits 124 may receive the light sensing instruction and the imaging instruction separately. The camera assembly 100 may generate two light sensing instructions and two imaging instructions, which may be a first light sensing instruction, a second light sensing instruction, a first imaging instruction and a second imaging instruction. The first light sensing instruction may be sent only to a first control circuit 124, but not to a second control circuit 124. The second light sensing instruction may be sent only to the second control circuit 124, but not to the first control circuit 124. Similarly, the first imaging instruction may be sent only to the first control circuit 124, but not to the second control circuit 124. The second imaging instruction may be sent only to the second control circuit 124, but not to the first control circuit 124. The two control circuits 124 may receive the light sensing instruction and the imaging instruction simultaneously. For example, the camera assembly 100 may generate a light sensing instruction and an imaging instruction. The light sensing instruction is sent to the first control circuit 124 and the second control circuit 124 simultaneously. In other words, one light sensing instruction may be used to control two light sensing regions 1222 to detect the illumination intensity. Similarly, the imaging instruction is sent to the first control circuit 124 and the second control circuit simultaneously. In other words, one imaging instruction may be used to control two imaging regions 1224 to acquire images.

In some embodiments, the pixel array 122 includes a plurality of pixels arranged in an array. The pixels in the light sensing region 1222 are configured to detect the illumination intensity. The pixels in the imaging region 1224 are configured to acquire the image. Each pixel can generate corresponding electric quantity according to the illumination intensity of light reaching the pixel. The control circuit 124 is electrically connected to each pixel. The control circuit 124 acquires the electric quantity generated by the corresponding pixel according to the received light sensing instruction or imaging instruction, and further analyzes magnitude of the electric quantity via the processor 200 to obtain the illumination intensity of the light reaching the corresponding pixel or further performs comprehensive analysis on the illumination intensities of light reaching several pixels via the processor 200 to obtain the image.

Referring FIG. 2 again, in some embodiments, there is a single camera assembly 100. The single camera assembly 100 is configured as a front camera assembly 100a. When light sensing sensors 1222 of two imaging sensors 12 detect a first illumination intensity and a second illumination intensity respectively, the processor 200 is configured to select a maximum of the first illumination intensity and the second illumination intensity as a final illumination intensity; or the processor 200 is configured to obtain a mean value of the first illumination intensity and the second illumination intensity as the final illumination intensity.

The front camera assembly 100a and the display screen 300 are disposed on the front face 400 of the electronic device 1000. The front camera assembly 100a may be configured to detect the illumination intensity on the front face 400 and acquire the image opposite to the front face 400 simultaneously.

In this way, the processor 200 can obtain the final illumination intensity after perform the comprehensive analysis on the first illumination intensity and the second illumination intensity respectively obtained by two light sensing regions 1222. The electronic device 1000 further performs corresponding control according to the final illumination intensity, for example adjusting the display brightness of the display screen 300. In some embodiments, during the usage, there may be a situation that two lens assemblies 10 receive very different illumination intensities. For example, when the user operates the electronic device 1000 under the shade of a tree, one lens assembly 10 may be in the shade while the other lens assembly 10 may be exposed under direct sunlight, such that there may be large difference between the first illumination intensity and the second illumination intensity detected by two light sensing regions 1222. The processor 200 processes the first illumination intensity and the second illumination intensity to obtain the final illumination intensity and adjusts the display brightness of the display screen 300 according to the final illumination intensity, thus preventing the display brightness from being too high or too low.

Further, the two lens assemblies 10 in the front camera assembly 100a may realize imaging simultaneously or on time-sharing.

Working or not working of each of the two light sensing regions 1222 and the two imaging regions 1224 in the front camera assembly 100a is independent of the others. The operating state of the front camera assembly 100a may be represented by a combination indicating whether each of the two light sensing regions 1222 and the two imaging regions 1224 is working or not. As illustrated in table 1, if an indication "✓" is used for a light sensing region 1222 or an imaging region 1224, it means that the light sensing region 1222 or the imaging region 1224 is working. If an indication "x" is used for a light sensing region 1222 or an imaging region 1224, it means that the light sensing region 1222 or the imaging region 1224 is not working.

TABLE 1

| | Front camera assembly | | | |
| | Image sensor 1 | | Image sensor 2 | |
| No. | Light sensing region | Imaging region | Light sensing region | Imaging region |
| --- | --- | --- | --- | --- |
| 1 | ✓ | x | x | x |
| 2 | ✓ | ✓ | x | x |
| 3 | ✓ | x | x | ✓ |
| 4 | ✓ | ✓ | x | ✓ |
| 5 | ✓ | x | ✓ | x |
| 6 | ✓ | ✓ | ✓ | x |
| 7 | ✓ | ✓ | ✓ | ✓ |
| 8 | x | ✓ | x | x |
| 9 | x | ✓ | x | ✓ |

In one embodiment, the two lens assemblies 10 in the front camera assembly 100a can realize imaging simultaneously to optimize the imaging quality. For example, the two lens assemblies 10 in the front camera assembly 100a can realize imaging simultaneously to obtain multiple frames of first images and multiple frames of second images. The processor 200 may analyze the multiple frames of first images and the multiple frames of second images and screens out a frame of image with highest imaging quality as a final image. In another embodiment, the processor 200 may perform merging and splicing processing on the first image and the second image to enhance color and definition of the final image.

In another embodiment, one lens assembly 10 in the front camera assembly 100a may be configured to assist the other lens assembly 10 in imaging, so as to optimize the imaging quality. For example, the one lens assembly 10 in the front camera assembly 100a may detect the current ambient brightness, and the processor 200 analyzes the ambient brightness to control exposure time of each light sensor component corresponding to each pixel in the other lens assembly 10 to obtain the image with suitable brightness. In this way, during the imaging of the camera assembly 100, one lens assembly 10 is used to detect the ambient brightness to assist the other lens assembly 10 in imaging, such that problems that the final image is subject to overexposure or has too low brightness can be avoided, thus improving the image quality.

In a further embodiment, the two lens assemblies 10 in the front camera assembly 100a may be enabled in sequence to realize imaging so as to optimize the imaging quality. For example, one lens assembly 10 in the front camera assembly 100a adopts a wide-angle lens, while the other lens assembly 10 adopts a telephoto lens. When the camera assembly 100 realizes imaging, the processor 200 enables the lens assembly 10 using the wide-angle lens to realize imaging. If the electronic device 1000 detects that the user takes a scaling-up operation for a preview image and the processor 200 derives an enlarging scale of the preview image higher than a predetermined value, the processor 200 immediately enables the lens assembly 10 using the telephoto lens to realize imaging. The wide-angle lens has a big field of view and a short focal length, while the telephoto lens has a small field of view and a long focal length. When the user takes the scaling-up operation for the preview image, it indicates that the user would like to take a picture of distant view, in this case, it needs to adopt the telephoto lens to get a clear picture of the distant view, thus it needs to switch the camera assembly 100 to the lens assembly 10 using the telephoto lens to realize imaging so as to improve the definition of the image.

However, in some usage scenario of the electronic device 1000, there may be a situation that the illumination intensities on the front face 400 and the back face 500 of the electronic device 1000 are different obviously. For example, the user may put the electronic device 1000 (e.g. a cell phone) on the table with the front face 400 opposite to the table top. If the display brightness of the display screen 300 is controlled only according to the illumination intensity on the front face 400 detected by the front camera assembly 100a, the display screen 300 may be in a non-display state or in a low-brightness-display state. When the user suddenly picks up the electronic device 1000 for using, the electronic device 1000 needs to awaken the display screen 300 or to increase the brightness of the display screen 300 in a short time. When the user frequently picks up and puts down the electronic device 1000, the electronic device 1000 would consume a great quantity of electricity energy for controlling the brightness of the display screen 300. For another example, if the user operates the electronic device 1000 when he/she lies down indoor, the back face 500 may be opposite to a light source (such as a ceiling lamp) amounted on the ceiling, such that the illumination intensity on the back face 500 may be greater than that on the front face 400. In this case, if the brightness of the display screen 300 is adjusted only according to the illumination intensity on the front face 400, it is possible that the user cannot make out the displayed content due to the low brightness. Thus, if the processor 200 can process both the illumination intensity on the front face 400 and the illumination intensity on the back face 500 of the electronic device 1000, an optimum illumination intensity can be obtained.

Figure 3:
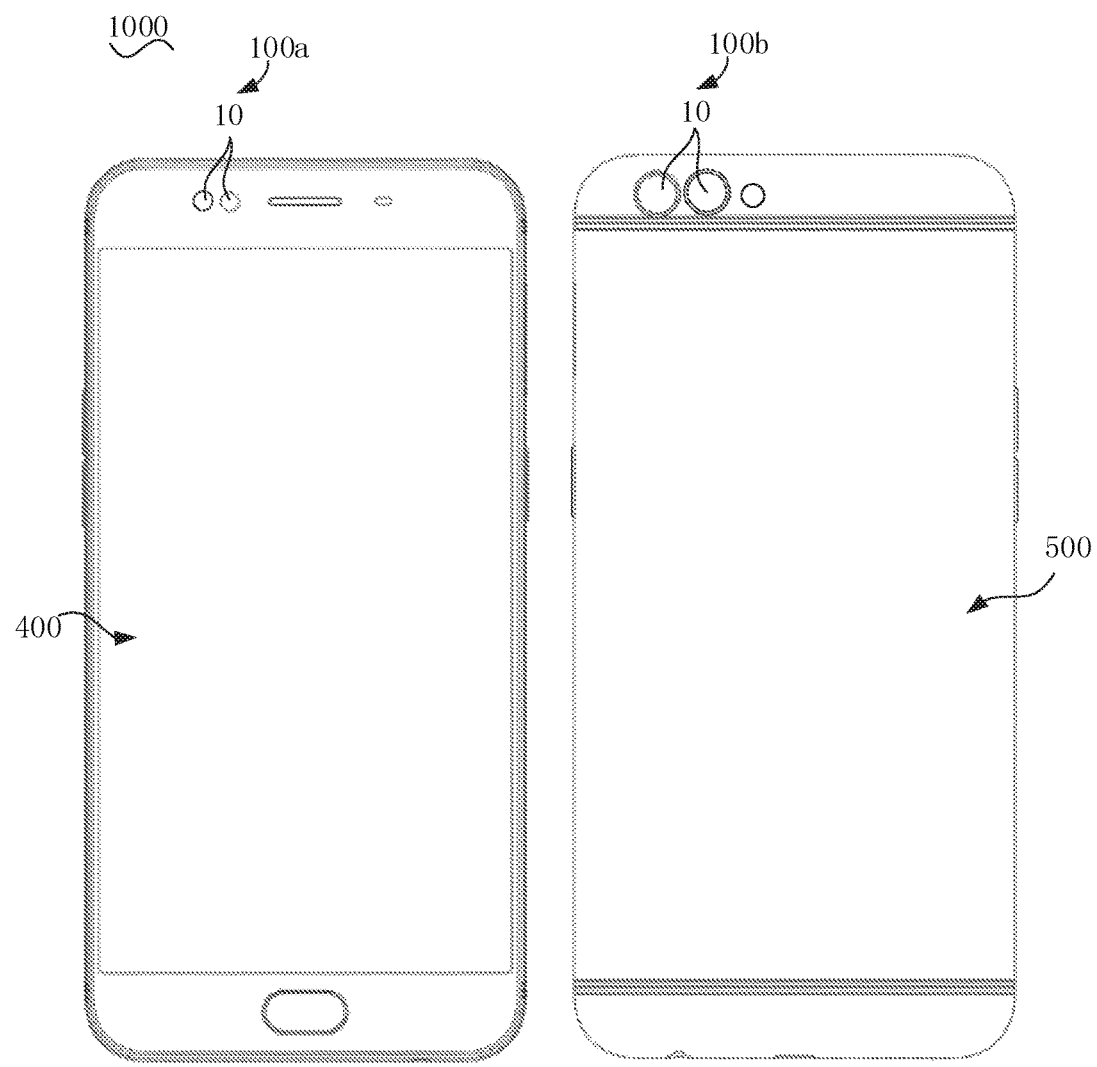
FIG. 3 is a front view and a back view of an electronic device according to an embodiment of the present disclosure.

Referring to FIG. 3, in some embodiments, there is a plurality of camera assemblies 100. One of them is configured as a front camera assembly 100a, a further of them is configured as a rear camera assembly 100b. The front camera assembly 100a and the display screen 300 are disposed on the front face 400 of the electronic device 1000. The front camera assembly 100a may be configured to detect the illumination intensity on the front face 400 and acquire the image opposite to the front face 400 simultaneously. The rear camera assembly 100b is disposed on the back face 500 of the electronic device 1000. The rear camera assembly 100b may be configured to detect the illumination intensity on the back face 500 and acquire the image opposite to the back face 500 simultaneously.

Working or not working of each of four light sensing regions 1222 and four imaging regions 1224 in the front camera assembly 100a and the rear camera assembly 100b is independent of the others. The operating state of the front camera assembly 100a may be represented by a combination indicating whether each of the light sensing regions 1222 and imaging regions 1224 in the front camera assembly 100a is working or not. The operating state of the rear camera assembly 100b may be represented by a combination indicating whether each of the light sensing regions 1222 and imaging regions 1224 in the rear camera assembly 100b is working or not. As illustrated in table 2, if an indication "✓" is used for a light sensing region 1222 or an imaging region 1224, it means that the light sensing region 1222 or the imaging region 1224 is working. If an indication "x" is used for a light sensing region 1222 or an imaging region 1224, it means that the light sensing region 1222 or the imaging region 1224 is not working. However, the operating state of the front camera assembly 100a and the operating state of the rear camera assembly 100b are not limited in the following table, there may be other operating states, which are not listed herein.

TABLE 2

| | Front camera assembly | | | | Rear camera assembly | | | |
| --- | --- | --- | --- | --- | --- | --- | --- | --- |
| | Image sensor 1 | | Image sensor 2 | | Image sensor 3 | | Image sensor 4 | |
| No. | Light sensing region | Imaging region | Light sensing region | Imaging region | Light sensing region | Imaging region | Light sensing region | Imaging region |
| 1 | ✓ | x | ✓ | x | ✓ | x | ✓ | x |
| 2 | ✓ | x | ✓ | x | ✓ | x | x | x |
| 3 | ✓ | x | x | x | ✓ | x | ✓ | x |
| 4 | ✓ | x | x | x | ✓ | x | x | x |
| 5 | ✓ | ✓ | ✓ | x | ✓ | x | ✓ | ✓ |
| 6 | ✓ | ✓ | x | x | ✓ | ✓ | ✓ | ✓ |
| 7 | ✓ | ✓ | x | ✓ | ✓ | x | x | x |
| . | . | . | . | . | . | . | . | . |
| . | . | . | . | . | . | . | . | . |
| . | . | . | . | . | . | . | . | . |

In some operating states, for example, in the operating state No. 1, two light sensing regions 1222 in the front camera assembly 100a detect a first illumination intensity and a second illumination intensity respectively, and two light sensing regions 1222 in the rear camera assembly 100b detect a third illumination intensity and a fourth illumination intensity respectively. In this case, the final illumination intensity of the electronic device 1000 can be calculated based on one of the following four ways.

Way one, the processor 200 may be configured to select a maximum of the first illumination intensity, the second illumination intensity, the third illumination intensity and the fourth illumination intensity as the final illumination intensity.

Way two, the processor 200 may be configured to obtain a mean value of the first illumination intensity and the second illumination intensity as a front illumination intensity (the front illumination intensity refers to an illumination intensity detected by the light sensing region in the front camera assembly), to obtain a mean value of the third illumination intensity and the fourth illumination intensity as a rear illumination intensity (the rear illumination intensity refers to an illumination intensity detected by the light sensing region in the rear camera assembly), and to select a maximum of the front illumination intensity and the rear illumination intensity as the final illumination intensity.

Way three, the processor 200 may be configured to select a maximum of the first illumination intensity and the second illumination intensity as the front illumination intensity, to obtain a mean value of the third illumination intensity and the fourth illumination intensity as the rear illumination intensity, and to select a maximum of the front illumination intensity and the rear illumination intensity as the final illumination intensity.

Way four, the processor 200 may be configured to obtain a mean value of the first illumination intensity and the second illumination intensity as the front illumination intensity, to select a maximum of the third illumination intensity and the fourth illumination intensity as the rear illumination intensity, and to select a maximum of the front illumination intensity and the rear illumination intensity as the final illumination intensity.

In some embodiments, the processor 200 can switch the calculation way among the above four ways, which can be realized by the user manually or automatically according to specific values of the illumination intensities. For example, when each of the first illumination intensity, the second illumination intensity, the third illumination intensity and the fourth illumination intensity is less than a predetermined illumination intensity threshold, it may be determined that the user may use the electronic device 1000 in a dark environment, thus the processor 200 can switch the calculation way to way one, i.e., selecting the maximum as the final illumination intensity.

To this, all of the four light sensing regions 1222 in the front camera assembly 100a and the rear camera assembly 100b are configured to detect illumination intensities, and the final illumination intensity obtained by the processor 200 can reflect the actual illumination intensity of the environment objectively.

In some operating states, for example, in the operating state No. 4 of table 2, one light sensing region 1222 in the front camera assembly 100a detects a first illumination intensity, one light sensing region 1222 in the rear camera assembly 100b detects a second illumination intensity. The processor 200 is configured to select a maximum of the first illumination intensity and the second illumination intensity as the final illumination intensity.

To this, each of the front camera assembly 100a and the rear camera assembly 100b enables one light sensing region 1222 when working to save energy. When one light sensing region 1222 in the front camera assembly 100a breaks down, the other light sensing region 1222 in the front camera assembly 100a can be used to detect the first illumination intensity. When one light sensing region 1222 in the rear camera assembly 100b breaks down, the other light sensing region 1222 in the rear camera assembly 100b can be used to detect the second illumination intensity. Thus, the normal use of the electronic device 1000 will be not affected.

In some operating states, for example, in the operating state No. 2 of table 2, two light sensing regions 1222 in the front camera assembly 100a detect a first illumination intensity and a second illumination intensity respectively, and one light sensing region 1222 in the rear camera assembly 100b detects a third illumination intensity. In this way, the final illumination intensity of the electronic device 1000 can be calculated based on one of the following two ways.

Way one, the processor 200 is configured to select a maximum of the first illumination intensity and the second illumination intensity as the front illumination intensity, and to select a maximum of the front illumination intensity and the third illumination intensity as the final illumination intensity.

Way two, the processor 200 is configured to obtain a mean value of the first illumination intensity and the second illumination intensity as the front illumination intensity, and to select a maximum of the front illumination intensity and the third illumination intensity as the final illumination intensity.

In some embodiments, the processor 200 can switch the calculation way between the above two ways. The rear camera assembly 100b only enables one light sensing region 1222 when working, to save energy. When one light sensing region 1222 in the rear camera assembly 100b breaks down, the other light sensing region 1222 in the rear camera assembly 100b can be used to detect the third illumination intensity. Thus, the normal use of the electronic device 1000 will be not affected.

In some operating states, for example, in the operating state No. 3 of table 2, one light sensing region 1222 in the front camera assembly 100a detects a first illumination intensity, and two light sensing regions 1222 in the rear camera assembly 100b detect a second illumination intensity and a third illumination intensity respectively. In this way, the final illumination intensity of the electronic device 1000 can be calculated based on one of the following two ways.

Way one, the processor 200 is configured to select a maximum of the second illumination intensity and the third illumination intensity as the rear illumination intensity, and to select a maximum of the rear illumination intensity and the first illumination intensity as the final illumination intensity.

Way two, the processor 200 is configured to obtain a mean value of the second illumination intensity and the third illumination intensity as the rear illumination intensity, and to select a maximum of the rear illumination intensity and the first illumination intensity as the final illumination intensity.

In some embodiments, the processor 200 can switch the calculation way between the above two ways. The front camera assembly 100a only enables one light sensing region 1222 when working, to save energy. When one light sensing region 1222 in the front camera assembly 100a breaks down, the other light sensing region 1222 in the front camera assembly 100a can be used to detect the first illumination intensity. Thus, the normal use of the electronic device 1000 will be not affected.

Further, the front camera assembly 100a and the rear camera assembly 100b can realize imaging simultaneously or on time-sharing.

In one embodiment, the front camera assembly 100a and the rear camera assembly 100b can realize imaging simultaneously. For example, the processor 200 enables both the front camera assembly 100a and the rear camera assembly 100b. The rear camera assembly 100b is configured to take a picture of the scenery behind the electronic device 1000. The front camera assembly 100a is configured to take a picture of face of the user. The display screen 300 of the electronic device 1000 displays the images captured by both the front camera assembly 100a and the rear camera assembly 100b simultaneously. Further, the processor 200 may store the images captured at the same time by both the front camera assembly 100a and the rear camera assembly 100b in association with each other. When the user browses the stored images, both the scenery and the face of the user who enjoys the scenery can be checked, thus improving the user experience.

In another embodiment, the front camera assembly 100a and the rear camera assembly 100b may realize imaging on time-sharing. For example, the front camera assembly 100a is working while the rear camera assembly 100b is disabled, or the front camera assembly 100a is disabled but the rear camera assembly 100b is working. In this way, the electronic device 1000 not only can take a picture of the scenery behind the electronic device 1000 but also can capture the selfie.

The two lens assemblies 10 in the front camera assembly 100a may realize imaging simultaneously or on time-sharing to optimize the imaging quality. The two lens assemblies 10 in the rear camera assembly 100b may also realize imaging simultaneously or on time-sharing to optimize the imaging quality, which will not be described herein.

Figure 4:
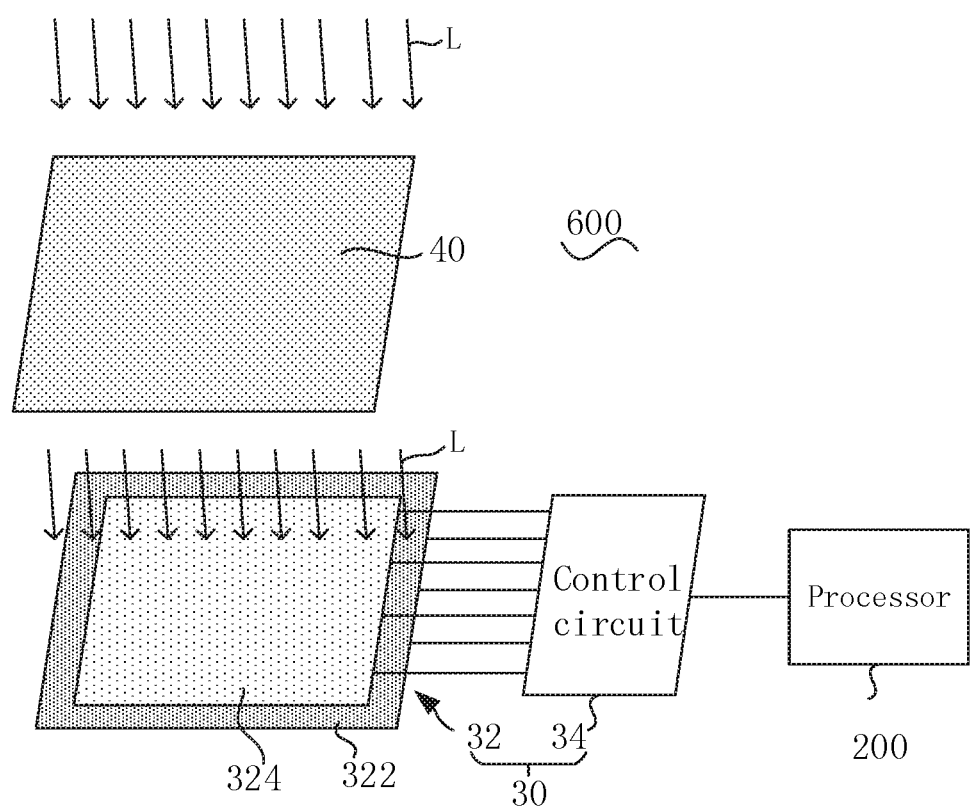
FIG. 4 is a schematic diagram of a different camera assembly according to an embodiment of the present disclosure.
Figure 5:
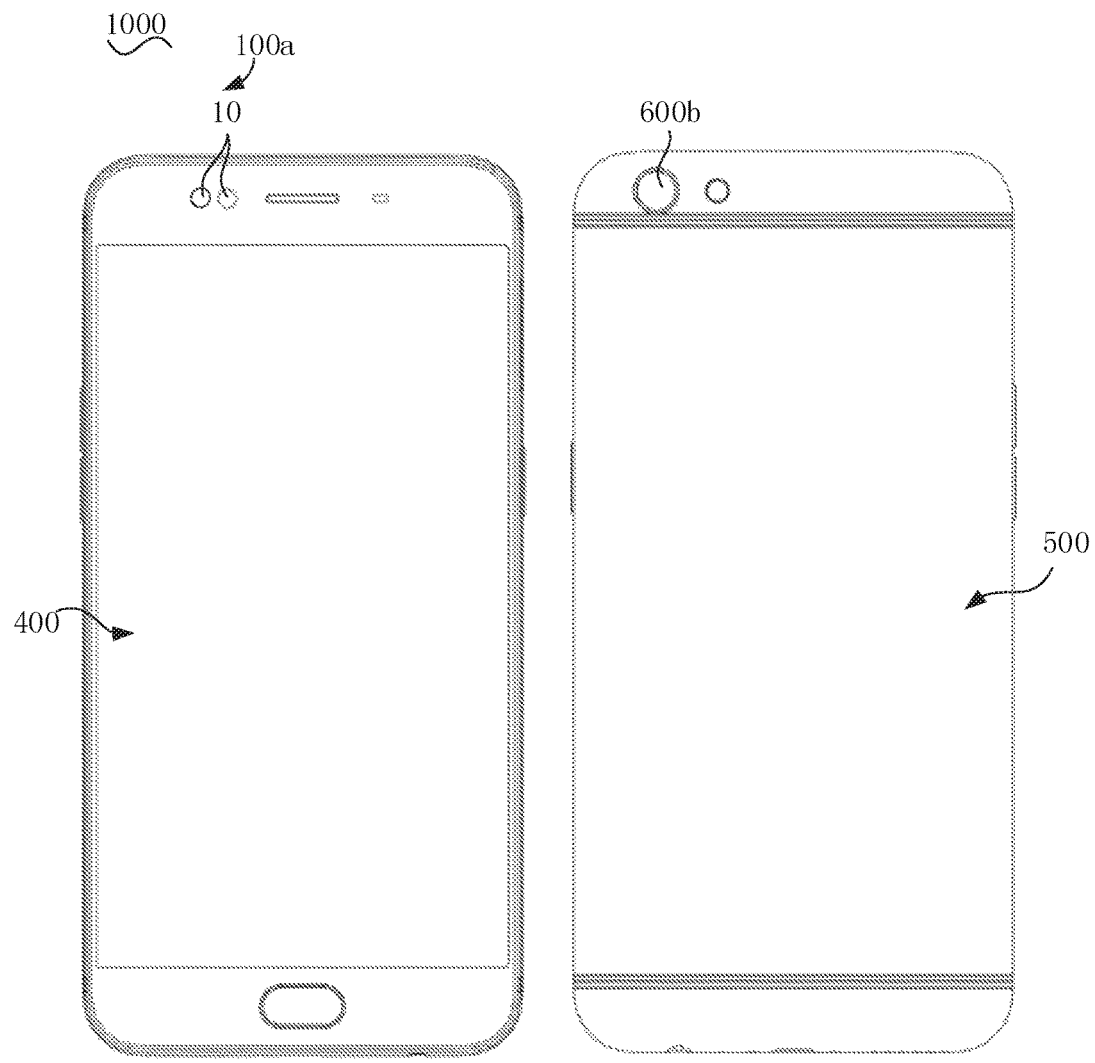
FIG. 5 is a front view and a back view of an electronic device according to an embodiment of the present disclosure.
Figure 6:
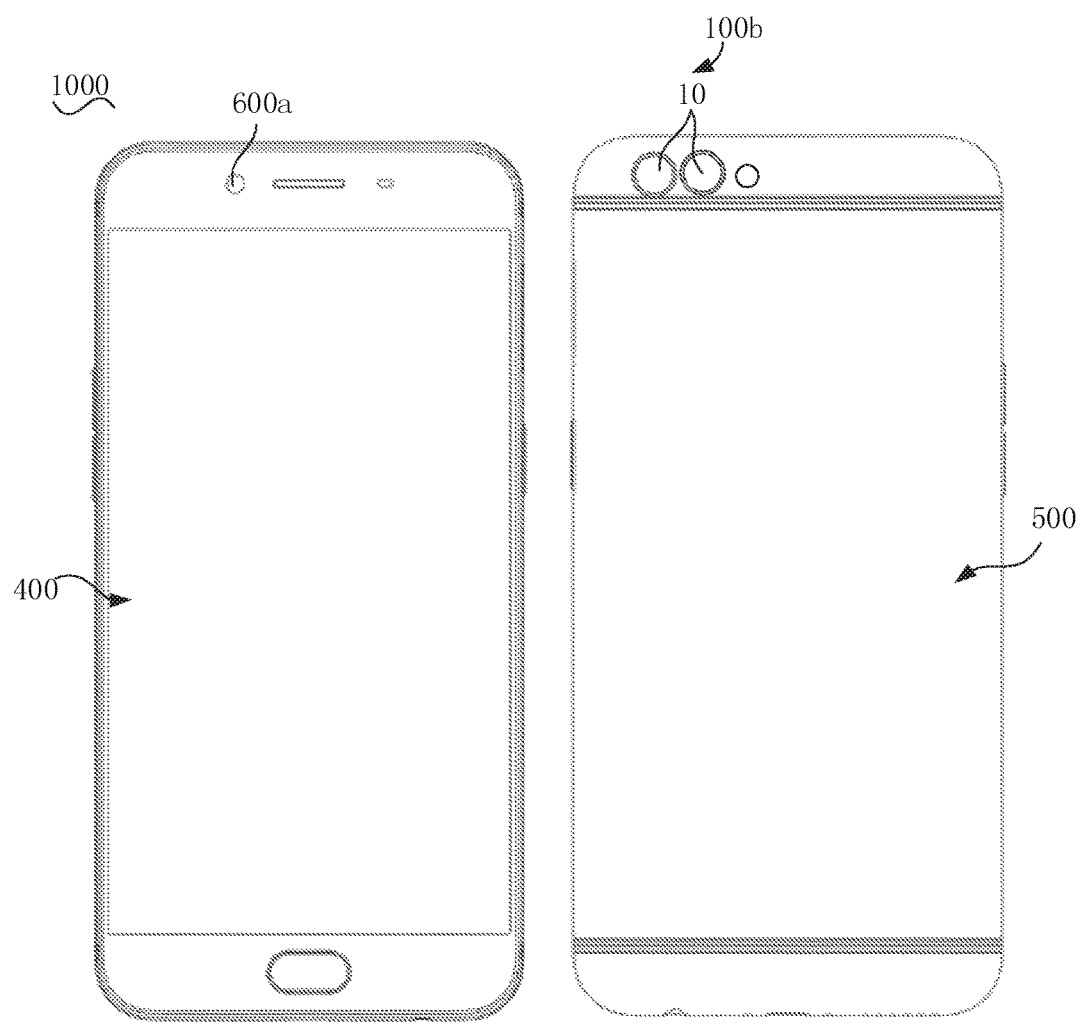
FIG. 6 is a front view and a back view of an electronic device according to an embodiment of the present disclosure.

Referring to FIGS. 4-6, in some embodiments, the electronic device 1000 further includes a different camera assembly 600. The different camera assembly 600 includes an image sensor 30. The image sensor 30 includes a pixel array 32 and a control circuit 34. The pixel array 30 includes a light sensing region 322 and an imaging region 324. The control circuit 34 is configured to control the light sensing region 322 to detect an illumination intensity when a light sensing instruction is received, and to control the imaging region 324 to acquire an image when an imaging instruction is received.

Referring to FIG. 5, in some embodiments, there is a single camera assembly 100 configured as the front camera assembly 100a. The different camera assembly 600 is configured as the rear camera assembly 600b.

Referring to FIG. 6, in some embodiments, there is a single camera assembly 100 configured as the rear camera assembly 100b. The different camera assembly 600 is configured as the front camera assembly 600a.

The processor 200 can perform comprehensive processing on the illumination intensities detected by the different camera assembly 600 and the camera assembly 100 and the acquired images to acquire a final illumination intensity and a final image. The processing ways may be similar to those used by the processor 200 to acquire the final illumination intensity and the final image according to the illumination intensities detected by two camera assemblies 100 and the images acquired by the two camera assemblies 100, which will not be described herein.

In some embodiments, a ratio of an area of the imaging region 1224 to an area of the pixel array 122 is greater than or equal to 0.6, and/or a ratio of an area of light sensing region 1222 to the area of the pixel array 122 is greater than or equal to 0.1. In some embodiments, the ratio of the area of the imaging region 1224 to the area of tie pixel array 122 may be 0.6, 0.7, 0.77, 0.8, 0.9 or the like. The ratio of the area of light sensing region 1222 to the area of the pixel array 122 may be 0.1, 0.2, 0.22, 0.4 or the like. Accordingly, it ensures that the image sensor 12 has a better imaging effect on the basis of having the function of detecting the illumination intensity.

In some embodiments, the two pixel arrays 122 of the two lens assemblies 10 may be the same, or may not be the same.

Figure 7:
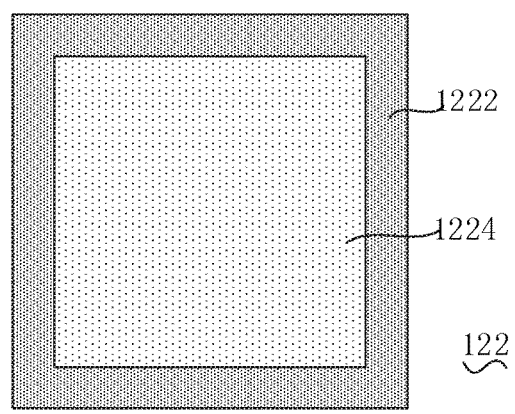
FIG. 7 is a schematic diagram of a pixel array according to an embodiment of the present disclosure.
Figure 8:
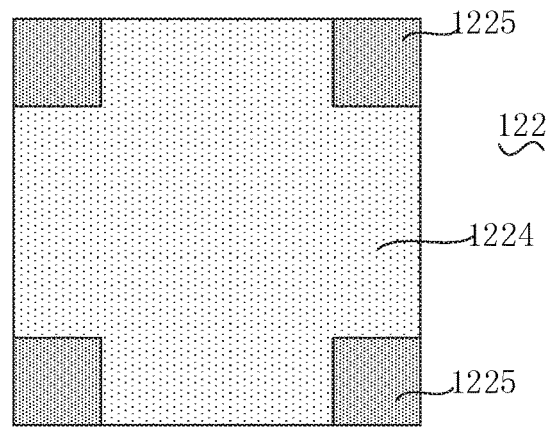
FIG. 8 is a schematic diagram of a pixel array according to an embodiment of the present disclosure.

Referring to FIGS. 7 and 8, in some embodiments, the imaging region 1224 is contiguous and located in the middle of the pixel array 122. The light sensing region 1222 is located around the imaging region 1224. Thus, it is easy for the contiguous imaging region 1224 to generate a continuous and complete image. In some embodiments, the center of the imaging region 1224 and the center of the pixel array 122 may coincide. The imaging region 1224 may adopt a central symmetry structure. The light sensing region 1222 may be located at one or more sides of the imaging region 1224.

In some embodiments, the light sensing region 1222 may include a plurality of light sensing sub-regions 1225 having the same area and spaced from each other.

The illumination intensity detected by the light sensing region 1222 may be obtained by taking illumination intensities detected by all the pixel points in the light sensing region 1222 into account. Thus, in order to obtain an objective illumination intensity, the light sensing region 1222 is decentralized as much as possible. In other words, the light sensing region 1222 is decentralized as a plurality of spaced light sensing sub-regions 1225.

The plurality of light sensing sub-regions 1225 spaced from each other may extend a detection range of the light sensing region 1222 and may improve an accuracy of detection of the light sensing region 1222. In an embodiment, there are four light sensing sub-regions 1225. The light sensing sub-regions 1225 may have a same area. The plurality of light sensing sub-regions 1225 may be arranged above, under, on the left, right of the imaging region 1224 respectively. The number and positions of the plurality of light sensing sub-regions are not limited herein.

Figure 9:
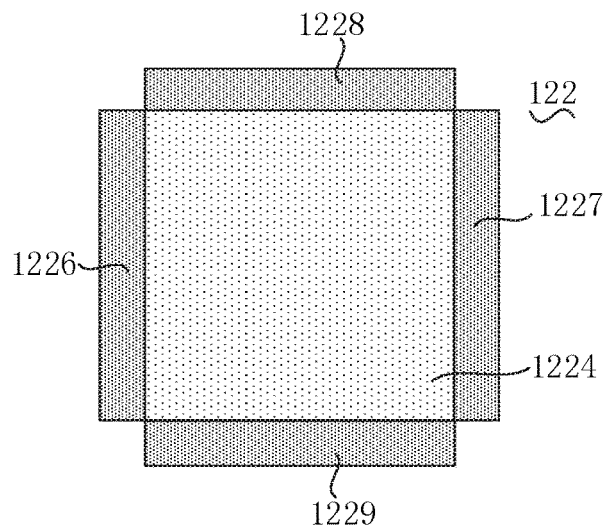
FIG. 9 is a schematic diagram of a pixel array according to an embodiment of the present disclosure.

Referring to FIG. 9, in some embodiments, the plurality of light sensing sub-regions 1225 include a left light sensing sub-region 1226 and a right light sensing sub-region 1227. The left light sensing sub-region 1226 is on the left of the imaging region 1224, and the right light sensing sub-region 1227 is on the right of the imaging region 1224. The left light sensing sub-region 1226 and the right light sensing sub-region 1227 are arranged symmetrically. The left light sensing sub-region 1226 detects a left illumination intensity (the left illumination intensity refers to an illumination intensity detected by the left light sensing sub-region). The right light sensing sub-region 1227 detects a right illumination intensity (the right illumination intensity refers to an illumination intensity detected by the right light sensing sub-region). The illumination intensity detected by the light sensing region 122 is a mean value of the left illumination intensity and the right illumination intensity.

To this, influences of the left light sensing sub-region 1226 and the right light sensing sub-region 1227 to the illumination intensity detected by the light sensing region 122 are the same essentially, thus the problem that the detection result is inaccurate because the light sensing region 122 is too sensitive to light change on the left or right of the imaging region can be avoided.

In some embodiments, the plurality of light sensing sub-regions 1225 include an upper light sensing sub-region 1228 and a lower light sensing sub-region 1229. The upper sensing sub-region 1228 is above the imaging region 1224. The lower light sensing sub-region 1229 is under the imaging region 1224. The upper light sensing sub-region 1228 and the lower light sensing sub-region 1229 are arranged symmetrically. The upper light sensing sub-region 1228 detects an upper illumination intensity (the upper illumination intensity refers to an illumination intensity detected by the upper light sensing sub-region). The lower light sensing sub-region 1229 detects a lower illumination intensity (the lower illumination intensity refers to an illumination intensity detected by the lower light sensing sub-region). The illumination intensity detected by the light sensing region 122 is a mean value of the upper illumination intensity and the lower illumination intensity.

To this, influences of the upper light sensing sub-region 1228 and the lower light sensing sub-region 1229 to the illumination intensity detected by the light sensing region 122 are the same essentially, thus the problem that the detection result is inaccurate because the light sensing region 122 is too sensitive to light change above or under the imaging region can be avoided.

In some embodiments, the plurality of light sensing sub-regions 1225 include a left light sensing sub-region 1226, a right light sensing sub-region 1227, an upper light sensing sub-region 1228 and a lower light sensing sub-region 1229. The left light sensing sub-region 1226 and the right light sensing sub-region 1227 are arranged symmetrically, and the upper light sensing sub-region 1228 and the lower light sensing sub-region 1229 are arranged symmetrically. In an embodiment, the left light sensing sub-region 1226, the right light sensing sub-region 1227, the upper light sensing sub-region 1228 and the lower light sensing sub-region 1229 are centrally symmetric. The left light sensing sub-region 1226 detects a left illumination intensity. The right light sensing sub-region 1227 detects a right illumination intensity. The upper light sensing sub-region 1228 detects an upper illumination intensity. The lower light sensing sub-region 1229 detects a lower illumination intensity. The illumination intensity detected by the light sensing region 122 is a mean value of the left illumination intensity, the right illumination intensity, the upper illumination intensity and the lower illumination intensity.

To this, influences of the left light sensing sub-region 1226, the right light sensing sub-region 1227, the upper light sensing sub-region 1228 and the lower light sensing sub-region 1229 to the illumination intensity detected by the light sensing region 122 are the same essentially, thus the problem that the detection result is inaccurate because the light sensing region 122 is too sensitive to light change above, under, on the left or right of the imaging region can be avoided.

The sub-regions being arranged symmetrically means that the sub-regions are symmetric in area and shape with regard to the imaging region 1224.

Figure 10:
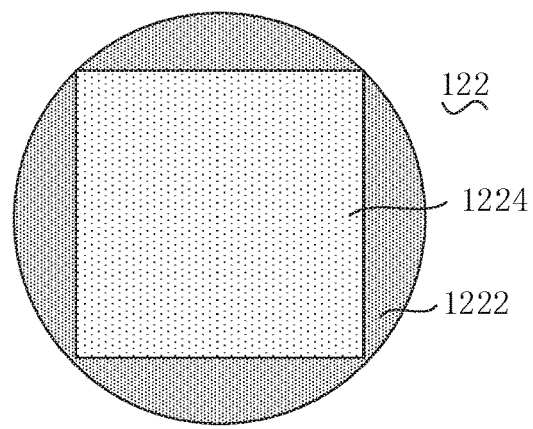
FIG. 10 is a schematic diagram of a pixel array according to an embodiment of the present disclosure.
Figure 11:
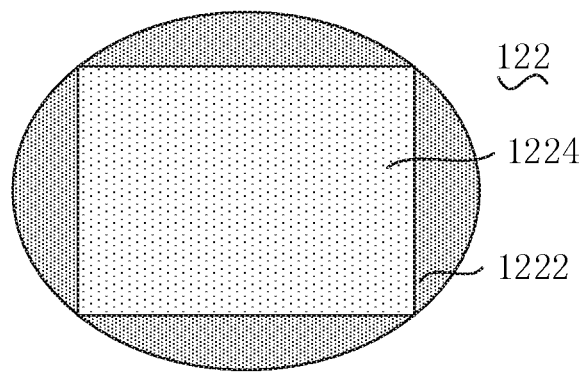
FIG. 11 is a schematic diagram of a pixel array according to an embodiment of the present disclosure.

Referring to FIGS. 10 and 11, in some embodiments, the pixel array 122 is in a shape of a circle or an ellipse. The imaging region 1224 is in a shape of an inscribed rectangle of the pixel array 122. The light sensing region 1222 includes a region other than the inscribed rectangle of the circle or the ellipse.

Accordingly, the imaging region 1224 is in the middle of the pixel array 122, which can acquire the image easily. The light sensing region 1222 is decentralized. The light sensing region 1222 on the left of the imaging region 1224 and the light sensing region 1222 on the right of the imaging region 1224 are symmetric. The light sensing region 1222 has the same sensitivity to light change on the left and right of the imaging region 1224. The light sensing region 1222 above the imaging region 1224 and the light sensing region 1222 under the imaging region 1224 are symmetric. The light sensing region 1222 has the same sensitivity to light change above and under the imaging region 1224. Thus, the light sensing region 1222 can obtain an accurate detection result.

Figure 12:
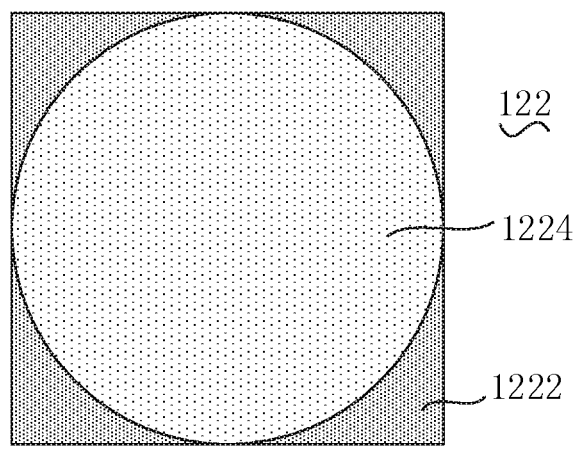
FIG. 12 is a schematic diagram of a pixel array according to an embodiment of the present disclosure.
Figure 13:
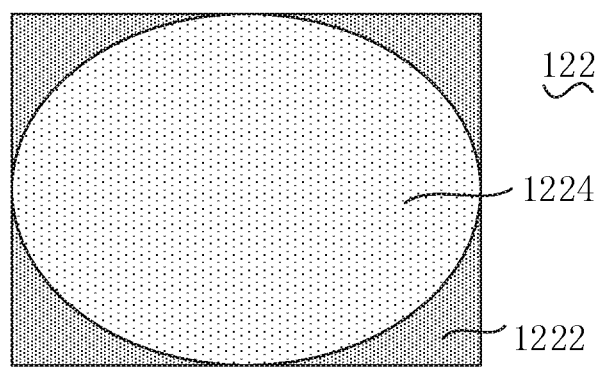
FIG. 13 is a schematic diagram of a pixel array according to an embodiment of the present disclosure.

Referring to FIGS. 12 and 13, the pixel array is in a shape of rectangle. The imaging region 1224 is in a shape of an inscribed circle or an inscribed ellipse of the rectangle. The light sensing region 1222 includes a region other than the inscribed circle or the inscribed ellipse of the rectangle.

Accordingly, the imaging region 1224 is in the shape of the circle or ellipse. The user can obtain an image in the shape of circle or ellipse via the imaging region 1224 without further post-processing, thus satisfying the user's personalized demand. The light sensing region 1222 is decentralized, such that the accuracy of the illumination intensity detected by the light sensing region 1222 can be improved.

Thus, the imaging region 1224 is in the middle of the pixel array 122, which can acquire the image easily. The light sensing region 1222 above the imaging region 1224 and the light sensing region 1222 under the imaging region 1224 are symmetric. The light sensing region 1222 on the left of the imaging region 1224 and the light sensing region 1222 on the right of the imaging region 1224 are symmetric.

Figure 14:
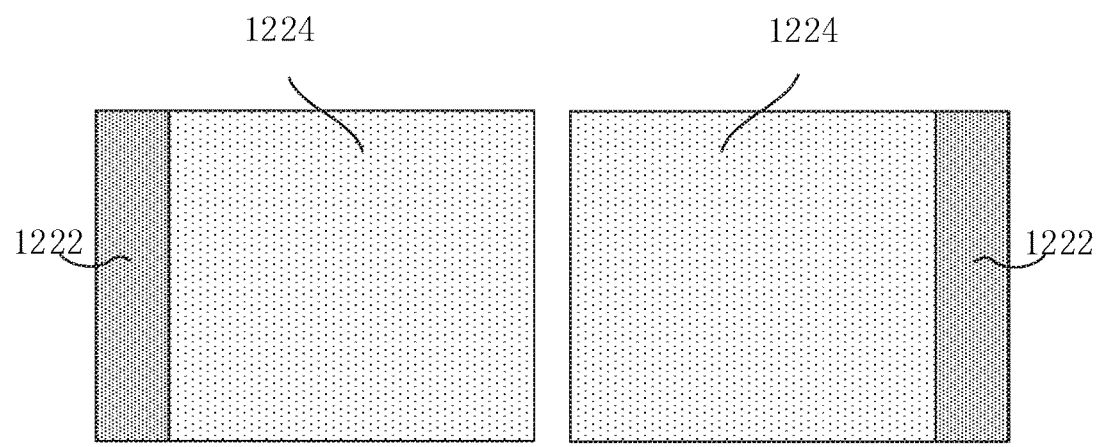
FIG. 14 is a schematic diagram of a pixel array according to an embodiment of the present disclosure.
Figure 15:
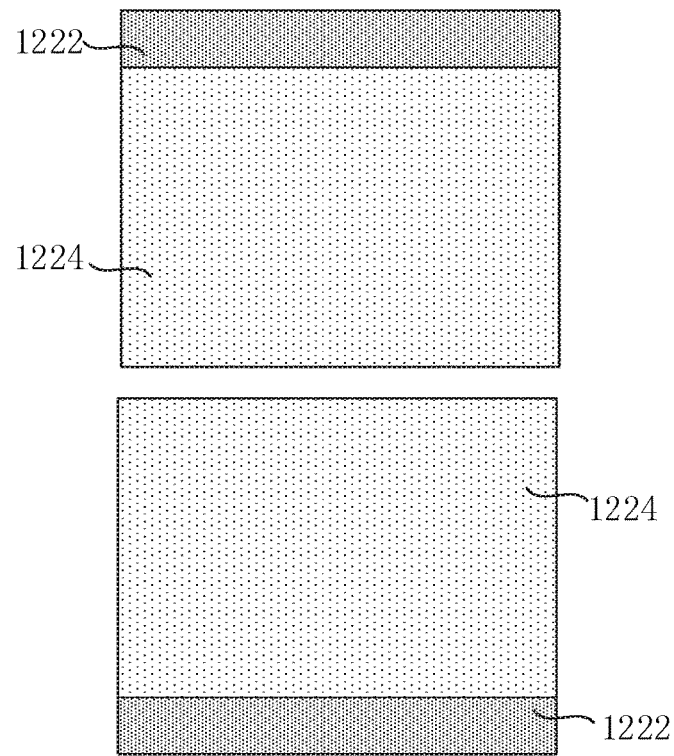
FIG. 15 is a schematic diagram of a pixel array according to an embodiment of the present disclosure.

Referring to FIGS. 14 and 15, in some embodiments, the imaging region 1224 is contiguous and the light sensing region 1222 is contiguous. The imaging region 1224 and the light sensing region 1222 share a common boundary. Two imaging regions 1224 of the two lens assemblies 10 are located between two light sensing regions 1222 of the two lens assemblies 10. Thus, the pixel array 122 has a simple structure. The control circuit 124 may easily find the pixels in the corresponding imaging region 1224 or the corresponding light sensing region 1222 after receiving the light sensing instruction or the imaging instruction. In some embodiments, the ratio of the area of the imaging region 1224 to the area of the pixel array 122 is 0.8. The ratio of the area of the light sensing region 1222 to the area of the pixel array 122 is 0.2. The imaging region 1224 may be in the shape of a rectangle, such that the imaging region 124 may obtain an image in the shape of the rectangle. The light sensing region 1222 may also be in the shape of a rectangle, and a long edge of the light sensing region 1222 may intersect a long edge of the imaging region 1224 or a short edge of the imaging region 1224.

Two imaging regions 1224 of the two lens assemblies 10 are arranged between two light sensing regions 1222 of the two lens assemblies 10. In some embodiments, as illustrated in FIG. 14, when the two lens assemblies 10 are arranged laterally, one light sensing region 1222 is arranged on the left of a left image sensor 12 and the other light sensing region 1222 is arranged on the right of a right image sensor 12. As illustrated in FIG. 15, when the two lens assemblies 10 are arranged longitudinally, one light sensing region 1222 is arranged above an upper image sensor 12 and the other light sensing region 1222 is arranged under a lower image sensor 12. In this way, the two light sensing regions 1222 of the camera assembly 10 can detect in wide range and obtain more accurate detection result.

The arrangement of the pixel array 122 of the image sensor 12 may be also suitable to the arrangement of the pixel array 32 of the image sensor 30, which will be not described herein. The different camera assembly 600 further includes a filter 40. Light passing through the filter 40 reaches the imaging region 324 of the image sensor 30.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. In this specification, exemplary descriptions of aforesaid terms are not necessarily referring to the same embodiment or example. Furthermore, the particular features, structures, materials, or characteristics may be combined in any suitable manner in one or more embodiments or examples. Moreover, those skilled in the art could combine different embodiments or different characteristics in embodiments or examples described in the present disclosure.

Moreover, terms of "first" and "second" are only used for description and cannot be seen as indicating or implying relative importance or indicating or implying the number of the indicated technical features. Thus, the features defined with "first" and "second" may comprise or imply at least one of these features. In the description of the present disclosure, "a plurality of" means two or more than two, unless specified otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, wherein the order of execution may differ from that which is depicted or discussed, including according to involved function, executing concurrently or with partial concurrence or in the contrary order to perform the function, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of acquiring the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer-readable medium comprise but are not limited to: an electronic connection (an electronic device) with one or more wires, a portable computer enclosure (a magnetic device), a random access memory (RAM), a read-only memory (ROM), an erasable programmable read-only memory (EPROM or a flash memory), an optical fiber device and a portable compact disk read-only memory (CDROM). In addition, the computer-readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method for the present disclosure may be achieved by commanding the related hardware with programs, the programs may be stored in a computer-readable storage medium, and the programs comprise one or a combination of the steps in the method embodiments of the present disclosure when running on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer-readable storage medium.

The storage medium mentioned above may be read-only memories, magnetic disks, CD, etc.

Although embodiments of present disclosure have been shown and described above, it should be understood that above embodiments are just explanatory, and cannot be construed to limit the present disclosure, for those skilled in the art, changes, alternatives, and modifications can be made to the embodiments without departing from spirit, principles and scope of the present disclosure.

What is claimed is:

1. A camera assembly, comprising at least two image sensors, wherein each image sensor comprises:
    a pixel array, comprising a light sensing region and an imaging region; and
    a control circuit, configured to:
        control the light sensing region to detect an illumination intensity when a light sensing instruction is received; and
        control the imaging region to obtain an image when an imaging instruction is received;
        wherein an area of the imaging region of one of the at least two image sensors is greater than an area of the imaging region of a further one of the at least two image sensors.

2. The camera assembly according to claim 1, wherein the imaging region of each image sensor is contiguous and located in the middle of the pixel array, and the light sensing region of each image sensor is located around the imaging region of said image sensor.

3. The camera assembly according to claim 2, wherein the light sensing region of each image sensor comprises at least two light sensing sub-regions having basically a same area and spaced from each other.

4. The camera assembly according to claim 3, wherein,
    the at least two light sensing sub-regions comprise a left light sensing sub-region on the left of the imaging region and a right light sensing sub-region on the right of the imaging region; wherein the left light sensing sub-region and the right light sensing sub-region are arranged symmetrically, the left light sensing sub-region is configured to detect a left illumination intensity, the right light sensing sub-region is configured to detect a right illumination intensity, and the illumination intensity detected by the light sensing region is a mean value of the left illumination intensity and the right illumination intensity; or
    the at least two light sensing sub-regions comprise an upper light sensing sub-region above the imaging region and a lower light sensing sub-region below the imaging region; wherein the upper light sensing sub-region and the lower light sensing sub-region are arranged symmetrically, the upper light sensing sub-region is configured to detect an upper illumination intensity, the lower light sensing sub-region is configured to detect a lower illumination intensity, and the illumination intensity detected by the light sensing region is a mean value of the upper illumination intensity and the lower illumination intensity; or the at least two light sensing sub-regions comprise a left light sensing sub-region on the left of the imaging region, a right light sensing sub-region on the right of the imaging region, an upper light sensing sub-region above the imaging region and a lower light sensing sub-region below the imaging region; wherein the left light sensing sub-region and the right light sensing sub-region are arranged symmetrically, the upper light sensing sub-region and the lower light sensing sub-region are arranged symmetrically, the left light sensing sub-region is configured to detect a left illumination intensity, the right light sensing sub-region is configured to detect a right illumination intensity, the upper light sensing sub-region is configured to detect an upper illumination intensity, the lower light sensing sub-region is configured to detect a lower illumination intensity, and the illumination intensity detected by the light sensing region is a mean value of the left illumination intensity, the right illumination intensity, the upper illumination intensity and the lower illumination intensity.

5. The camera assembly according to claim 1, wherein the pixel array of one image sensor is in a shape of one of a circle and an ellipse, the imaging region of said image sensor is in a shape of an inscribed rectangle of the pixel array, and the light sensing region of said image sensor comprises a region other than the inscribed rectangle of the one of the circle and the ellipse.

6. The camera assembly according to claim 1, wherein the pixel array of one image sensor is in a shape of a rectangle, the imaging region of said image sensor is in a shape of one of an inscribed circle and an inscribed ellipse of the rectangle, and the light sensing region of said image sensor comprises a region other than the one of the inscribed circle and the inscribed ellipse of the rectangle.

7. The camera assembly according to claim 1, wherein the imaging region of each image sensor is contiguous and the light sensing region of each image sensor is contiguous; the imaging region and the light sensing region of each image sensor share a common boundary.

8. The camera assembly according to claim 7, wherein the camera assembly comprises two image sensors, and two imaging regions of the two image sensors are located between two light sensing regions of the two image sensors.

9. The camera assembly according to claim 1, wherein the pixel array of each image sensor is configured such that at least one of following conditions is satisfied: a ratio of an area of the imaging region of said image sensor to an area of the pixel array of said image sensor being greater than or equal to 0.6; and a ratio of an area of the light sensing region of said image sensor to the area of the pixel array of said image sensor being greater than or equal to 0.1.

10. The camera assembly according to claim 1, further comprising at least two filters disposed corresponding respectively to the imaging regions of the at least two image sensors.

11. The camera assembly according to claim 10 wherein the at least two filters are visible light filters.

12. A mobile electronic device, comprising a camera assembly and a processor; wherein, the camera assembly comprises at least two image sensors; wherein each image sensor comprises: a pixel array, comprising a light sensing region and an imaging region; and a control circuit, configured to: control the light sensing region to detect an illumination intensity when a light sensing instruction is received; and control the imaging region to obtain an image when an imaging instruction is received; and the processor is configured to generate the light sensing instruction and the imaging instruction;

wherein an area of the imaging region of one of the at least two image sensors is greater than an area of the imaging region of a further one of the at least two image sensors.

13. The mobile electronic device according to claim 12, wherein the mobile electronic device comprises one camera assembly configured as a front camera assembly;

wherein when light sensing regions of at least two image sensors of the camera assembly detect a first illumination intensity and a second illumination intensity respectively, the processor is configured to:

determine a maximum of the first illumination intensity and the second illumination intensity as a final illumination intensity; or obtain a mean value of the first illumination intensity and the second illumination intensity as a final illumination intensity.

14. The mobile electronic device according to claim 12, wherein the mobile electronic device comprises at least two camera assemblies, one of the at least two camera assemblies is configured as a front camera assembly and a further one of the at least two camera assemblies is configured as a rear camera assembly;

wherein when two light sensing regions of the front camera assembly detect a first illumination intensity and a second illumination intensity respectively, and two light sensing regions of the rear camera assembly detect a third illumination intensity and a fourth illumination intensity respectively, the processor is configured to:

determine a maximum of the first illumination intensity, the second illumination intensity, the third illumination intensity and the fourth illumination intensity as a final illumination intensity; or obtain a mean value of the first illumination intensity and the second illumination intensity as a front illumination intensity, obtain a mean value of the third illumination intensity and the fourth illumination intensity as a rear illumination intensity, and determine a maximum of the front illumination intensity and the rear illumination intensity as a final illumination intensity; or determine a maximum of the first illumination intensity and the second illumination intensity as a front illumination intensity, obtain a mean value of the third illumination intensity and the fourth illumination intensity as a rear illumination intensity, and determine a maximum of the front illumination intensity and the rear illumination intensity as a final illumination intensity; or obtain a mean value of the first illumination intensity and the second illumination intensity as a front illumination intensity, determine a maximum of the third illumination intensity and the fourth illumination intensity as a rear illumination intensity, and determine a maximum of the front illumination intensity and the rear illumination intensity as a final illumination intensity.

15. The mobile electronic device according to claim 12, wherein the mobile electronic device comprises at least two camera assemblies, one of the at least two camera assemblies is configured as a front camera assembly and a further one of the at least two camera assemblies is configured as a rear camera assembly;

wherein when a light sensing region of the front camera assembly detects a first illumination intensity, and a light sensing region of the rear camera assembly detects a second illumination intensity, the processor is configured to:

determine a maximum of the first illumination intensity and the second illumination intensity as a final illumination intensity.

16. The mobile electronic device according to claim 12, wherein the mobile electronic device comprises at least two camera assemblies, one of the at least two camera assemblies is configured as a front camera assembly and a further one of the at least two camera assemblies is configured as a rear camera assembly;

wherein when two light sensing regions of the front camera assembly detect a first illumination intensity and a second illumination intensity respectively, and a light sensing region of the rear camera assembly detects a third illumination intensity, the processor is configured to:

determine a maximum of the first illumination intensity and the second illumination intensity as a front illumination intensity, and determine a maximum of the front illumination intensity and the third illumination intensity as a final illumination intensity; or obtain a mean value of the first illumination intensity and the second illumination intensity as a front illumination intensity, and determine a maximum of the front illumination intensity and the third illumination intensity as a final illumination intensity.

17. The mobile electronic device according to claim 12, wherein the mobile electronic device comprises at least two camera assemblies, one of the at least two camera assemblies is configured as a front camera assembly and a further one of the at least two camera assemblies is configured as a rear camera assembly;

wherein when a light sensing region of the front camera assembly detects a first illumination intensity, and two light sensing regions of the rear camera assembly detect a second illumination intensity and a third illumination intensity respectively, the processor is configured to:

determine a maximum of the second illumination intensity and the third illumination intensity as a rear illumination intensity, and determine a maximum of the rear illumination intensity and the first illumination intensity as a final illumination intensity; or obtain a mean value of the second illumination intensity and the third illumination intensity as a rear illumination intensity, and determine a maximum of the rear illumination intensity and the first illumination intensity as a final illumination intensity.

18. The mobile electronic device according to claim 12, further comprising another camera assembly, wherein the another camera assembly comprises an image sensor comprising:

a pixel array, comprising a light sensing region and an imaging region; and a control circuit, configured to:

control the light sensing region of the imaging sensor of the another camera assembly to detect an illumination intensity when the light sensing instruction is received; and control the imaging region of the imaging sensor of the another camera assembly to obtain an image when the imaging instruction is received.

19. The mobile electronic device according to claim 18, wherein the mobile electronic device comprises one camera assembly configured as one of a front camera assembly and a rear camera assembly, and the said another camera assembly is configured as the other one of the front camera assembly and the rear camera assembly.

\* \* \* \* \*